United States Patent
Lopez et al.

(10) Patent No.: US 6,415,900 B1
(45) Date of Patent: Jul. 9, 2002

(54) HYDRAULIC CONTROL RECEIVER WITH CLOSING PLATE

(75) Inventors: Carlos Lopez, Creteil; Sylvain Thomire, Levallois; Frederic Rey, Paris, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/125,674
(22) PCT Filed: Dec. 22, 1997
(86) PCT No.: PCT/FR97/02386
  § 371 (c)(1),
  (2), (4) Date: Dec. 31, 1998
(87) PCT Pub. No.: WO98/28552
  PCT Pub. Date: Jul. 2, 1998

(30) Foreign Application Priority Data

Dec. 23, 1996 (FR) .............................................. 96 16025
Dec. 11, 1997 (FR) .............................................. 97 15834

(51) Int. Cl.$^7$ .............................................. F16D 25/08
(52) U.S. Cl. .............................. 192/85 CA; 192/91 A; 92/107

(58) Field of Search .......................... 192/85 CA, 91 A, 192/98; 92/107, 128

(56) References Cited

U.S. PATENT DOCUMENTS

| | | | |
|---|---|---|---|
| 4,051,937 A | 10/1977 | Garrett et al. | |
| 4,913,276 A | * 4/1990 | Hayashi et al. | .......... 192/85 CA |
| 4,960,193 A | * 10/1990 | Hodge | ...................... 192/91 A |
| 5,307,915 A | * 5/1994 | Grosspietsch et al. | ........ 192/98 |

FOREIGN PATENT DOCUMENTS

| | | |
|---|---|---|
| DE | 30 43 861 A | 8/1982 |
| EP | 0 074 671 A | 3/1983 |
| GB | 2 116 282 A | 9/1983 |
| GB | 2 259 555 A | 3/1993 |

* cited by examiner

Primary Examiner—Richard M. Lorence
(74) Attorney, Agent, or Firm—Liniak, Berenato, Longacre & White

(57) ABSTRACT

A hydraulic receiver for clutch control having a fixed part including an internal guide tube and a concentric external body defining a blind annular cavity supplied with fluid. A piston carrying a drive element for engaging a declutching device is mounted inside the blind annular cavity.

8 Claims, 6 Drawing Sheets

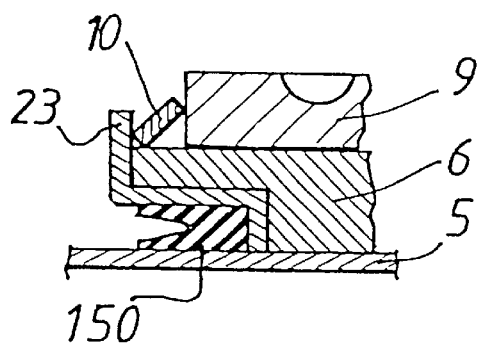
FIG.3
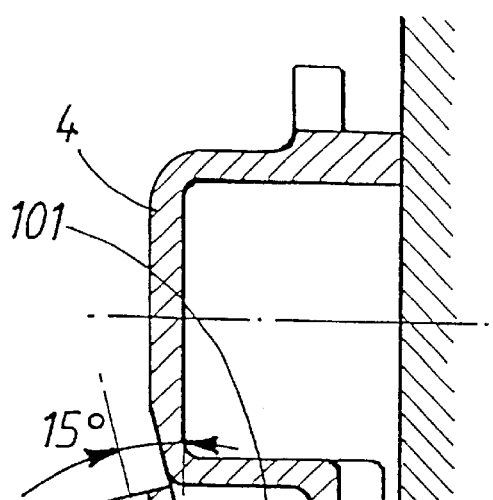
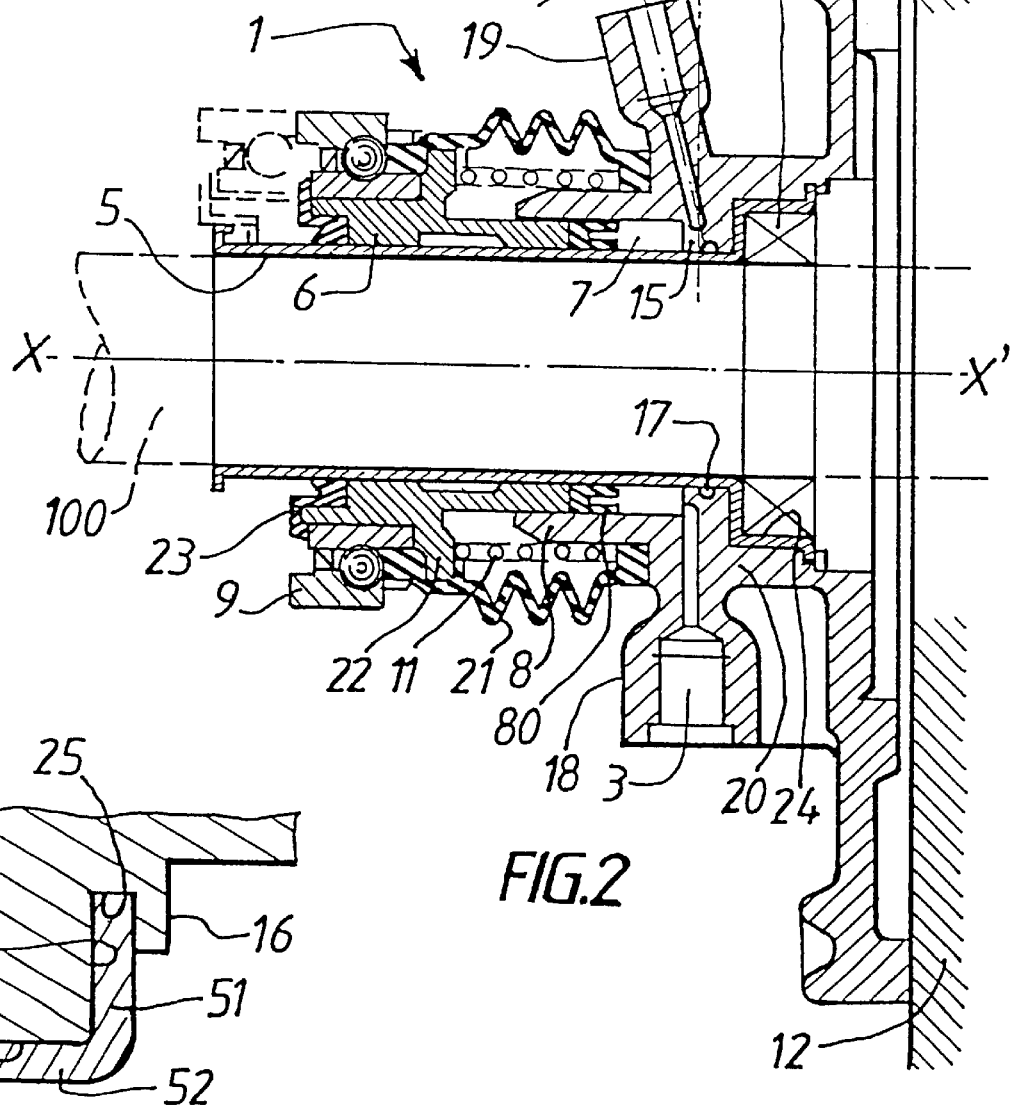
FIG.2
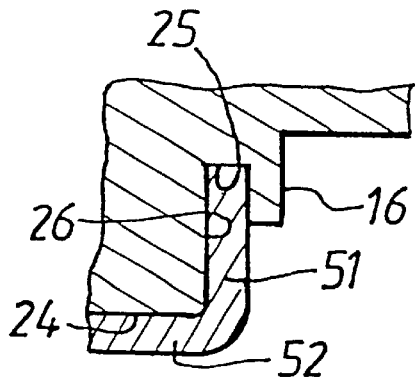
FIG.4

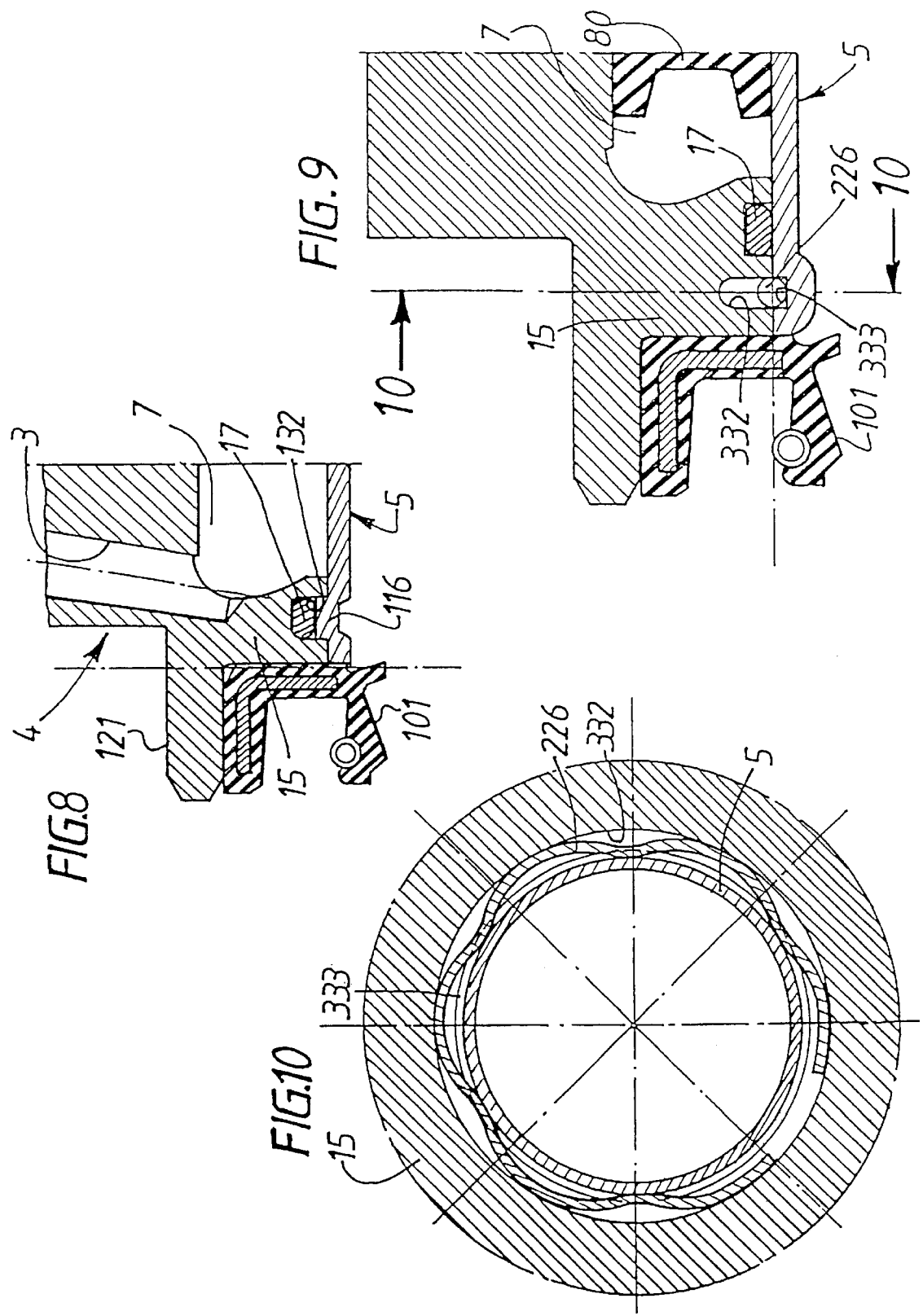

HYDRAULIC CONTROL RECEIVER WITH CLOSING PLATE

BACKGROUND OF THE INVENTION

1. Field of the Invention

The present invention concerns hydraulic receivers, for clutch control, notably in motor vehicles, having a fixed part comprising an internal guide tube and a concentric external body defining a blind annular cavity suitable for being supplied with fluid and inside which there is mounted, so as to be axially movable, a piston carrying a drive element suitable for acting on the declutching device of a clutch.

2. Description of the Related Art

Such a receiver, also referred to as a hydraulic receiving cylinder, is described in the document EP-B-0 168 932.

In the latter, the internal guide tube is metallic and projects axially with respect to the external body. This tube has at its rear end a transverse plate trapped, in use, between two opposite surfaces formed respectively on the external body and on a fixed structure to which the external body is fixed.

In addition, provision is made for fixing the plate to the body by clamping, as can be seen in FIG. 1 of this document. A static sealing joint is interposed between the plate and the dorsal face of the external body. In use the pressure varies in the cavity delimiting, with the piston, a variable-volume control chamber.

In certain cases it may be desirable not to grip the plate between the fixed structure and the external body since this makes it necessary to provide a specific surface on the fixed structure.

In this case it may be thought to use solely a fixing by crimping of the plate onto the metallic external body made of castable material, for example based on aluminium.

A problem of strength of the fixing is then posed under the effect of the pressure variations occurring, in use, in the cavity, knowing that the guide tube plate forms the base of this cavity.

In order to do this it may be thought to stiffen the internal periphery of the plate, for example by means of a rim projecting axially with respect to the external periphery of the plate. This increases the cost of the guide tube.

The object of the present invention is to mitigate these drawbacks simply and economically.

The invention therefore aims to make the fixing of the guide tube to the external body more robust. Another aim of the invention is to reduce the cost of the guide tube.

SUMMARY OF THE INVENTION

According to the invention a receiver of the type indicated above, in which connection means act between the external body and the guide tube in order to fix the guide tube to the external body, is characterised in that the base of the blind cavity consist of an internal flange on the external body directed radially towards the axis of axial symmetry of the guide tube. By virtue of the invention it is not a radial plate on the guide tube but an internal flange on the external body which is subject in use to the pressure variations during the operations of disengaging and engaging the clutch.

This internal flange is more robust so that the connection means are conserved. The fixing of the guide tube to the external body is more robust, more reliable and more durable.

In addition, the guide tube is conserved because it is the external body which undergoes the pressure variations. The guide tube is less stressed so that the piston slides and therefore moves more precisely and accurately.

In one embodiment, the connection means act between the internal flange and the guide tube.

The guide tube being fixed to the internal flange therefore uses less consumption of materials since its fixing to the external body takes place closer to the axis of axial symmetry of the guide tube. The static sealing joint acting between the external body and the guide tube is also conserved since it is the internal flange and therefore the solid external body which undergoes the pressure variations. This joint is more economical since it is of smaller size than that of the prior art.

In one embodiment, the fluidtightness and fixing of the guide tube are achieved between the internal periphery of the internal flange and the external periphery of the guide tube.

By virtue of these characteristics it is possible for the guide tube to have no transverse plate and thus be purely tubular in shape. This makes it possible to reduce the costs, as well as the material consumed and the manufacturing operations. The guide tube is easier to store and handle. The static sealing joint has the smallest possible size and can be axially oblong in shape for a better seal.

In one embodiment the joint is mounted in a sealing groove which the internal flange has at its internal periphery. Naturally, the structures can be reversed, the groove being formed by pressing in the metallic tube.

The connection means can consist of a local upsetting or creeping of material of the guide tube in a connection groove in the internal flange. The connection groove can be produced at the axially oriented internal periphery, of the internal flange or in the transverse face, turned in the opposite direction to the cavity, of the internal flange. Thus the fixing is robust and reliable, the internal flange being thicker than the guide tube.

The connection groove can be merged with the sealing groove, the joint being interposed between the bottom of the groove, preferably splayed towards the guide tube, and the local upsetting of material of the guide tube. This makes it possible to reduce the number of machinings of the external body.

As a variant, the connection groove is distinct from the sealing groove and has a radially oblong shape for receiving an open ring of corrugated shape radially. The ring is retractable and radially deformable.

The guide tube has a groove opposite the connection groove for partial reception of the corrugated ring. The guide tube is connected to the external body by snapping on. By virtue of this arrangement, the guide tube can be symmetrical in shape and have, at its other end, an identical groove for receiving a circlip or spring ring limiting the axially movement of the piston with respect to the guide tube.

The two grooves are produced by upsetting material radially in the direction of the axis of axial symmetry of the guide tube. When the connection is effected at the transverse face of the internal flange, the guide tube can be immobilised axially by means of a circlip or a nut.

In the above, the material of the external body does not undergo any crimping operation. This body is therefore conserved and can thus be made from mouldable plastic material. In a variant, the flange made of mouldable plastic material can be reinforced by means of an insert, for example metallic.

It will be appreciated that the fixed structure has no need to be machined in order to offer a bearing surface for the guide tube.

The external body can have, at the rear of the internal flange, a housing for a rotating joint acting between the external body and a rotating shaft, such as the input shaft of the gearbox passing through the guide tube, which can surround the rotating joint.

It should be noted that the internal flange is easily obtained by moulding.

Because the guide tube is conserved, the piston can slide directly on the guide tube, and can carry at its front end a metallic bearing piece obtained by pressing.

The piston can be made from synthetic material such as mouldable plastic material reinforced with fibres. Preferably, this material has good slip qualities.

The bearing piece, in one embodiment, serves as a support for a axially acting elastically washer, referred to as a self-centring washer, pressing an internal radial flange on one of the ball bearing raceways in contact with a support section of the bearing piece. The bearing piece also bears the end of a sealing bellows and a preloading spring surrounded by the bellows.

The ball bearing is intended to cooperate with the declutching device and is advantageously fluidtight.

The declutching device can consist of diaphragm fingers forming means of engaging the clutch or clutch levers distinct from the clutch engagement means then consisting of coil springs or a Belleville washer acting between the cover and the declutching thrust plate. This clutch mechanism can be provided with a device for taking up wear compensating at least for the wear on the friction linings of the clutch friction member forming part of the clutch.

In a variant, the external body can consist of a large closure plate attached to the casing of a transmission box in order to close the opening of the said box through which an input shaft passes.

The closure plate has an internally hollow protuberance forming part of the fixed part of the concentric receiver of the hydraulic clutch control.

The protuberance is advantageously in a single piece with the plate and has on the inside the internal flange according to the invention.

In one embodiment, the connection means are then offset axially and radially with respect to the static joint.

In another embodiment, the guide tube has a transverse plate directed radially towards the outside and clamped in contact with the rear face of the transverse flange.

Other advantages will emerge from the following description, with regard to the accompanying drawings in which:

BRIEF DESCRIPTION OF THE DRAWINGS

FIG. 2 is a view in section along the line A—A in FIG. 1;

FIG. 3 is a partial view in section to a large scale showing the coupling of the non-rotating ring of the clutch release bearing to the piston of the receiver;

FIG. 4 is a partial view, to a large scale, of the clamping of the guide tube;

FIG. 8 is a partial view in axial section of the receiver showing the rear thereof as well as another means of connecting the guide tube to the external body of the concentric receiver;

FIG. 9 is a view similar to FIG. 8 for another example embodiment;

FIG. 10 is a view in section along the line 10 in FIG. 9;

DETAILED DESCRIPTION OF THE PREFERRED EMBODIMENTS

Figure 1:
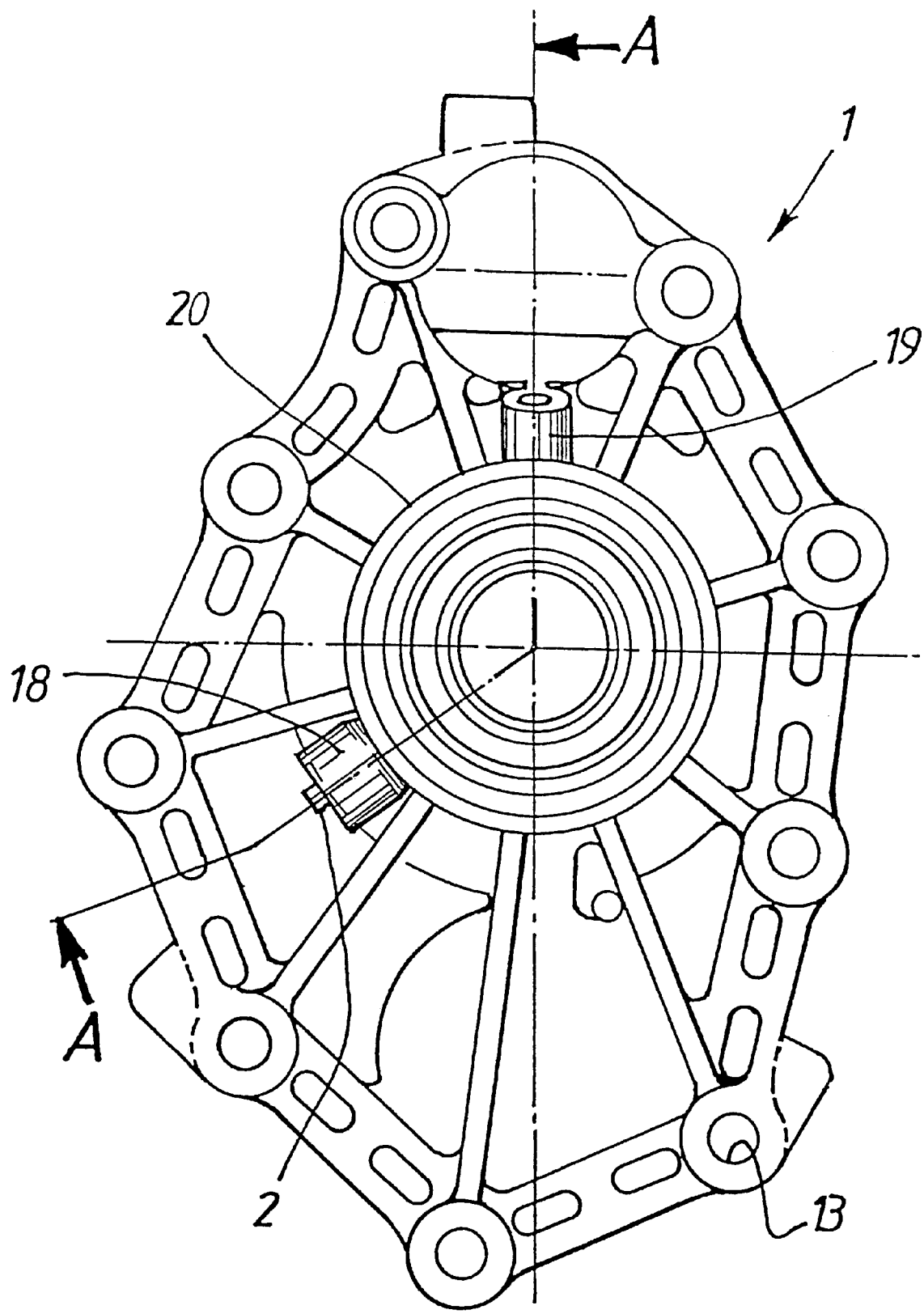
FIG. 1 is a front view of a closure plate carrying an internal radial flange according to the invention.

In the figures all the elements common to the different embodiments are given the same references.

The figures depict the concentric receiver 1 of a hydraulic clutch control comprising, in a known fashion, a sender, the output of which is connected, via a pipe 2, to a supply input 3 of the receiver 1 provided with a variable-volume chamber.

A sender is activated in different ways and has a piston 6 movable inside a fixed body 4, 5.

Since it is a case here of an application for a motor vehicle, the sender can be activated by the driver via the clutch pedal.

As a variant the sender can be activated in an assisted fashion, for example by means of an electric motor, one of the supply terminals of which is connected to a computer controlling the start-up of the engine according to given programs; the output shaft of the said engine forming the input element of a mechanical transmission with elastic assistance means, the said transmission comprising an output element for example in the form of a pusher acting on the piston of the sender. In every case, the piston defines, with the fixed body of the sender, a variable-volume chamber. When the sender is activated its piston is moved axially so that the variable-volume chamber is pressurised, as well as the variable volume chamber of the receiver 1, which increases in volume whilst that of the sender decreases in volume.

When the sender is deactivated the chambers of the sender and receiver are depressurised, the chamber of the receiver decreasing in volume whilst that of the sender increases in volume. There is therefore, during these operations, a transfer of control fluid from one chamber to the other. It should be noted that the diaphragm, which in a conventional fashion has a friction clutch member, exerts a return action on the piston when the clutch is re-engaged; the chamber of the receiver resuming its initial volume.

The control fluid can be gaseous in nature. It may for example be compressed air. Here the control fluid is hydraulic in nature and consists of oil.

For simplicity the control will be referred to as a hydraulic control, whatever the nature of the fluid.

As is known the chamber of the receiver 1 is delimited by a fixed part 4 and 5 and by a movable part 6 in cylinder/piston relationship.

The fixed part 4, 5 delimits a cavity 7 of annular shape into which the supply inlet 3 opens out.

The movable part is a piston 6, annular in shape, movable axially inside the cavity 7 in order to define, with the latter, the aforementioned variable-volume chamber.

The cavity 7, as well as the said chamber, is therefore allowed to be pressurised and depressurised from the inlet 3 via the pipe 2.

Here the fixed part 4, 5 and the movable part 6—the piston 6—are coaxial whilst being arranged concentrically. The receiver 1 is therefore of the concentric type; the cavity 7 being blind, of axial orientation and annular.

More precisely the fixed part 4, 5 is here in two concentric parts 4, 5.

One of the parts, namely the external part 4, roughly of annular shape and hereinafter referred to as the external body, has at its centre a roughly tubular front end portion 8 surrounding the other piece 5 in the form of a guide tube 5 and forming part of a protuberance 20, roughly tubular in shape. This tube 5 is metallic. It is thin in order to reduce the radial bulk and has an axis of axial symmetry X–X'.

The thickness of the tube 5 is less than the thickness of the tubular portion 8, with an axial length less than that of the tube 5.

The tube 5, here metallic, projects axially with respect to the tubular portion 8 and serves as a guide for the piston 6, which thus surrounds the main part of the tube 5, whilst being surrounded by the tubular portion 8.

The piston 6 carries at its rear end a dynamic joint with lips 80. This joint enters inside the cavity 7 and makes the latter fluidtight. The front end of the piston 6 acts on a clutch release bearing 9, which consists here of a ball bearing having a rotating race, forming a drive element, suitable for acting on the diaphragm of the clutch, and a non-rotating race in connection with the piston 6. This piston 6 acts through its front end on the non-rotating race, separated from the rotating race by balls.

Here the races of the bearing 9 are concentric and coaxial. This thrust bearing is carried by the piston 6 sliding axially along the metallic tube 5.

The bearing 9 can be fixed radially whilst for example being a force fit, through its non-rotating race, on the piston 6.

Here the bearing can move radially with respect to the piston 6 and the diaphragm of the clutch in order to reduce wear, knowing that the axis of axial symmetry of the diaphragm is not merged with that of the receiver 1.

It is possible for the centring of the bearing 9 with respect to the diaphragm not to be maintained. For example, an element made of elastic material, such as elastomer, can be interposed radially between the piston 6 and the non-rotating race of the bearing. This element also couples the bearing to the piston.

Here a radial clearance exists between the front end of the piston 6 and the bearing 9 and an axially acting elastic washer 10 couples the bearing to the piston 6. The bearing 9 can creep radially with respect to the piston until it finds its centring position with respect to the diaphragm. This centring is subsequently maintained by the elastic washer 10. The clutch release bearing 9 is thus of the maintained self-centring type.

The rotating race, here the external race, is profiled for local contact with the diaphragm, more precisely for local contact with the internal end of the fingers of the latter.

Thus, when the internal end of the fingers of the diaphragm, centrally open, is curved in shape, the front face of the rotating race, intended to cooperate with the said end, is roughly flat in shape.

When the internal end of the fingers of the diaphragm is flat, the external face of the rotating race is then curved.

Figure 6:
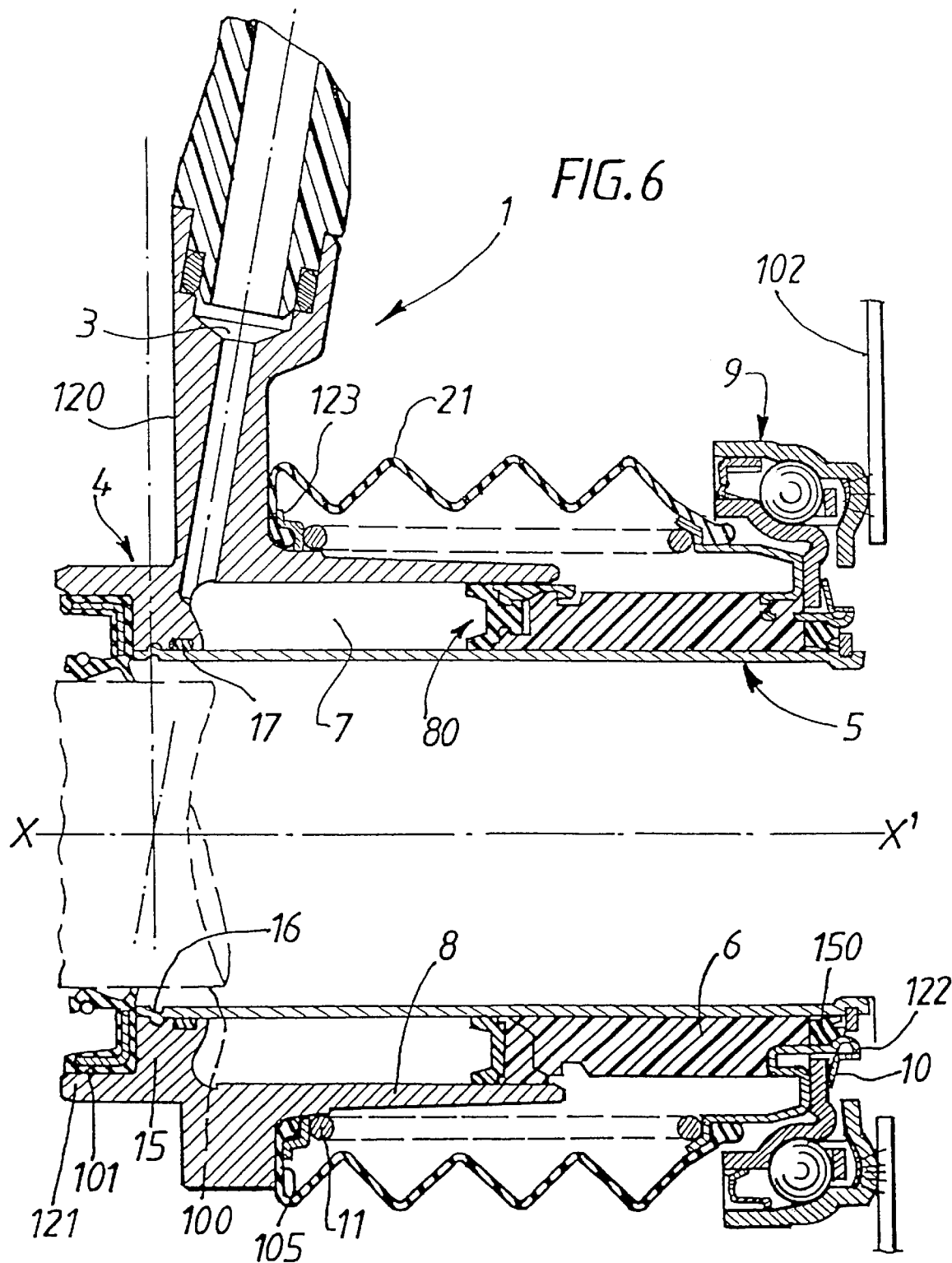
FIG. 6 is a view in axial section of the receiver of FIG. 5.

Here the thrust bearing 9 is able to act in thrust on the internal end, depicted at 102 in FIG. 6, of the fingers of the diaphragm, the peripheral part of which, in the form of a Belleville washer, acts on the thrust plate of the clutch in order normally to force the said plate in the direction of the vehicle engine flywheel, forming a reaction plate, in order to clamp the friction linings of the clutch friction member between the said reaction and thrust plates fixed with respect to rotation to the vehicle engine crankshaft.

This friction member, also referred to as a friction disc, has at its centre a hub coupled rigidly or elastically to a disc carrying the friction linings. The hub is fluted internally for its connection with respect to rotation to a driven shaft, here the input shaft 100 of the gearbox. This shaft 100 passes through the guide tube 5 whilst being surrounded by it. The clutch is therefore normally engaged, the volume of the variable chamber of the receiver 1 then being at a minimum. A return spring 11 is interposed axially between the portion 8 and the ball bearing in order to maintain, in a known fashion, the rotating race of the bearing 9 in permanent contact with the diaphragm in order to reduce wear. The torque of the drive shaft is therefore transmitted to the input shaft of the gearbox.

In order to disengage the clutch, the cavity 7 of the receiver is pressurised as mentioned above, which causes an increase in volume of the chamber thereof and a movement of the piston 6 and of the thrust bearing 9 towards the left in FIG. 2.

The diaphragm, mounted pivotally on a cover fixed to the engine flywheel, tilts until its action on the thrust plate is cancelled out. The clutch is then disengaged since the friction linings of the clutch friction member are then released.

The engine torque is then no longer transmitted to the input shaft of the gearbox having a casing 12. Naturally, the clutch can be equipped with a device for taking up wear on the friction linings.

When the cavity 7 is depressurised, the diaphragm moves the clutch release bearing and piston towards the right in FIG. 2. The volume of the chamber of the receiver 1 is then at a minimum and the piston 6 resumes its initial position. In this position, a residual pressure exists in the cavity 7.

The fixed part 4, 5 is intended to be fixed here to the front wall 12 of the fixed casing of the gearbox. The wall 12 has the input shaft 100 of the gearbox pass through it with the intervention of a joint 101, referred to as a rotating joint (visible more clearly in FIG. 6) between the wall 12 and the input shaft as described below. This wall 12 therefore has an opening for the passage of the input shaft. This opening is here large and is closed in FIGS. 1 to 4 by a ribbed plate 4 provided with numerous holes 13 for fixing of the plate 4 to the wall 12 by means of screws, the threaded body of which passes through the holes 13 in order to come into engagement with female threads on the wall 12.

The heads of the screws bear on the front face of the plate 7, here roughly ovoid in shape. This plate 4 serves as a closure plate for the opening in the wall 12 mentioned above.

According to one characteristic this plate 4 is used to integrate this plate into the hydraulic receiver 1 and form the aforementioned external body 4 surrounding the guide tube 5.

Thus the protuberance 20 with its tubular portion 8, of axial orientation, is fixed to the plate. This protuberance 20 can be attached by welding to the plate 4 with holes in it for passage of the input shaft of the gearbox. Here the protuberance 20 is annular in shape and is in a single piece with the plate 4 made of castable material. This plate 4 is here based on aluminium. Advantage is taken of this, having regard to the strength of the plate 4, to extend the latter, behind the wall 8, by means of a transverse flange 15 directed radially towards the inside and constituting the base of the blind cavity 7. This flange 15 will be referred to as the internal flange and is thicker than the guide tube 5. It is directed radially towards the axis X–X'.

This arrangement makes it possible to limit the deformation of the cavity 7 under the effect of the pressure variations to which it is subject during the operations of disengaging and re-engaging the clutch. The movement of the piston 6 is thus more precise and accurate.

In addition the guide tube 5 and more precisely the means 16 of connecting it to the closure plate 4, as well as the static sealing joint 17 of the cavity 7, are conserved. The joint 17 is toric in shape.

Here the connection means 16 consist of a fixing by crimping of a collar 51, of transverse orientation, directed radially outwards, which the guide tube 5 has at its rear end.

These crimping means 16 are offset axially and radially with respect to the sealing joint 17 acting between the internal periphery of the internal flange 15, directed radially inwards, and the external periphery of the guide tube 5. Here the joint 17 is carried by the internal flange 15 whilst being mounted in a sealing groove, not referenced, which the said flange has at its internal periphery. This flange 15 is of low height and forms part of the aforementioned protuberance 20, here in a single piece with the plate 4. The crimping means 16 are offset towards the rear with respect to the sealing joint.

The tubular portion 8 constitutes the front part of this protuberance 20, having at its external periphery two projections 18, 19 directed approximately radially towards the outside.

The projections 18, 19 are provided with drillings, as can be seen in FIG. 2, extended in the mass of the protuberance in order to open out in the base of the blind control cavity 7. The drillings therefore open out at the level of the front face of the flange 15, knowing that the projections 18, 19 belong respectively to the feed inlet 3 and to the drain circuit. The return spring 11 surrounds the tubular portion 8 whilst being centred by it. A shoulder is formed at the junction of the tubular portion 8 with the main part of the protuberance 20 able here to have the input shaft 100 of the gearbox pass through it.

This shoulder serves as a support for an end rim on a protective bellows 21 surrounding the spring 11, in the form of a coil spring. The spring 11 bears at one of its ends on the said rim. The other end of the bellows 21 is attached to a transverse disc 22 which the piston 6 has at its front end. The disc 22 is directed radially outwards and serves as a support here, through its front face, for the non-rotating race of the clutch release bearing 9 and through its rear face on the other end of the spring 11.

As mentioned previously, a radial clearance exists between the piston 6 and this non-rotating race, here the internal race the self-centring spring 10 consists (FIG. 3) of a Belleville washer bearing on the front edge of the non-rotating race and on a connecting piece 23 made of sheet metal, fitted on the internal periphery of a recess (not referenced) which the piston 6 has at its front end. This recess serves as a housing for a scraper joint 150 surrounded by the piece 23 and bearing on a radial flange directed inwards, which the said piece 23 has at its rear end. At its front end the piece 23 has a radial flange directed outwards for the washer 10 to bear on.

The protuberance 20, internally hollow, therefore has on the inside a front portion, partly defining the cavity 7 open axially towards the front, and a stepped rear portion, separated from each other by the internal flange 15. This rear portion is stepped and is delimited on the inside by a first axially oriented cylindrical portion 24 and a second axially oriented portion 25 with a larger diameter.

The portion 24 is axially delimited to the front by the flange 15 and to the rear by a transversely oriented flange 26 (FIG. 4) directed radially outwards. The flange 26, referred to as the external flange, serves as a support for the rear collar 51 of the guide tube 5. The flange 26 therefore serves as an abutment shoulder for the collar 51. The guide tube 5 externally marries the shape of the first portion 24 and of the rear face of the flange 15, whilst being in intimate contact with the said rear face.

The diameter of the main part of the tube 5 is therefore less than that of its rear cylindrical portion 52. The portion.24 therefore forms a bearing surface for the rear portion 52 of the tube 5.

From the rear end of the plate 4, the material issuing from the second portion 25 of the protuberance 20 is pushed axially in a known fashion by means of a crimping tool, in order to form crimping sectors 16, with axial immobilisation of the collar 51 between the shoulder 26 of the protuberance 20 and the crimping sectors 16, in the form of annular sectors, knowing that, during this operation, the material creeps radially inwards. The collar 51 is also locked with respect to rotation under the effect of the clamping force caused by the crimping. Naturally, in a variant, the crimping sectors 16 can form a continuous ring.

It should be noted that the diameter of the first portion 24, forming a bearing surface, is roughly equal to the external diameter of the tubular portion 8, whilst here being slightly greater than it.

In this way a much stronger crimping is obtained than the one described in the document EP-A-0 168 932 since the hydraulic supply pressure in the annular cavity 7 is exerted on the flange 15 so that the collar 51 is conserved.

This makes the assembly of the guide tube 5 more reliable and stronger. The service life of this receiver is therefore increased, in a simple and economical fashion, the metallic guide tube 5 being obtained easily by the chasing of material, whilst the plate 8 made of castable material is easily obtained by casting. The joint 17 is also conserved since the crimping is not performed at this level, contrary to the arrangement described in the document EP-A-0 168 932. The joint 16 is not crushed axially.

The fluidtightness of the receiver 1 is therefore improved, whilst being more reliable. In addition the rear portion 52 of the tube 5 can serve as a centring surface for the joint shown diagrammatically at 101, in contact with the input shaft of the gearbox. The internal stepping of the rear portion of the tube 5 and of the plate 4 assists this.

It will be appreciated that the ribbed plate 4 is robust and that incipient ruptures are very much reduced compared with a solution in which the receiver is fixed by lugs to the gearbox casing.

This is due to the large number of fixing holes 13. Naturally a sealing joint (not visible) is interposed between the casing 12 and the plate 4, knowing that the plate 4 is fixed at the edge of the opening in the casing 12 of the gearbox in order to close the said opening.

Naturally, as a variant, the gearbox can be replaced by another transmission box, for example with variable pulleys.

As a variant the connection means 16 can consist of a fixing of the collar 51 to the abutment shoulder 26 by means of screws.

Any other assembly means can be envisaged.

As will have been understood, the external flange 26 delimits at the front the second cylindrical portion 25 serving as a centring surface for the collar 51 whilst being in intimate contact with the external periphery of the collar 51.

In FIG. 2, the outlines of the chasing of material resulting in the broadening of the second portion 25 can therefore be seen.

It should be noted that the plate 4 is provided with ribs (FIG. 1) connecting its protuberance to areas provided with fixing holes 13.

This fixing, as a variant, can be effected by riveting or by means of bolts.

Naturally the presence of a large closure plate is not obligatory. The plate 4 can be replaced by a smaller external body and the crimping can be performed in the vicinity of the flange 15.

Figures 5, 7:
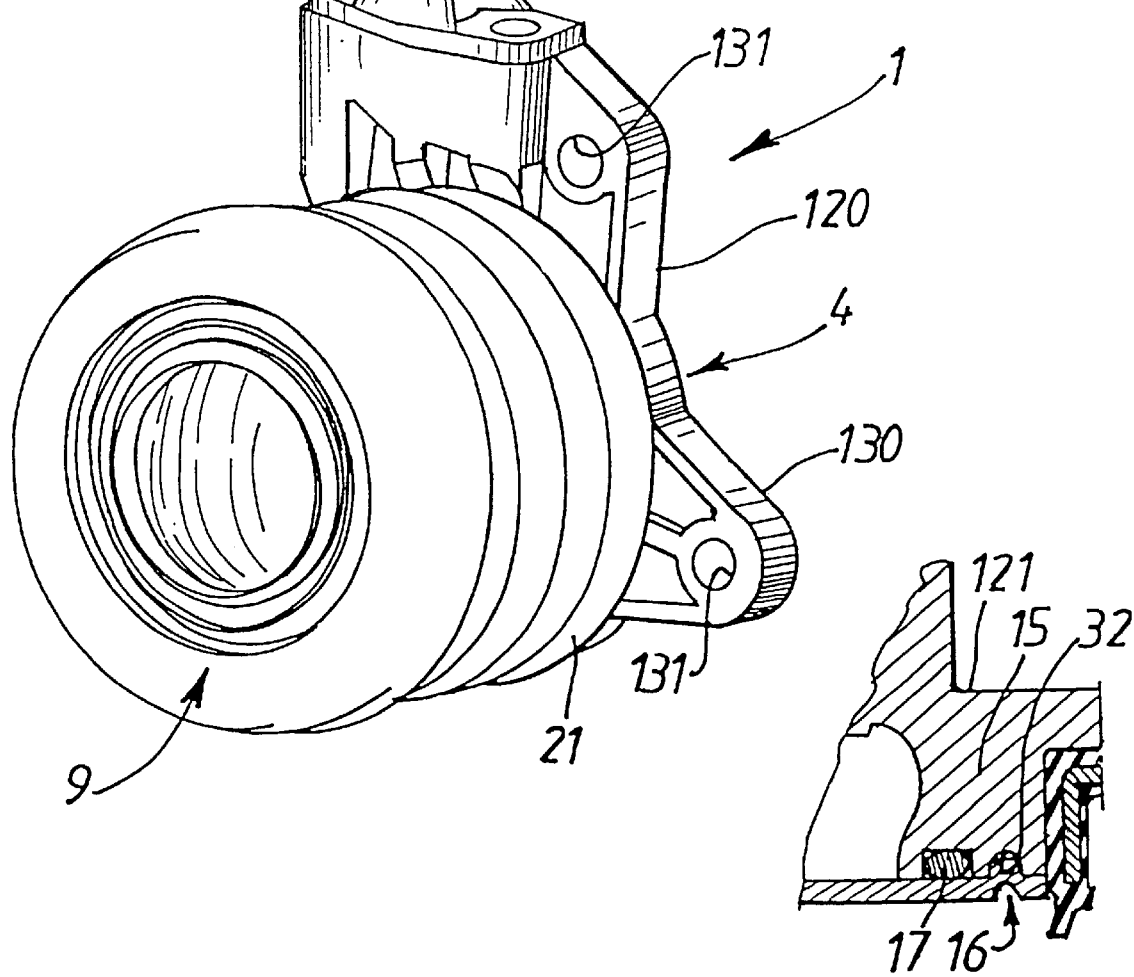
FIG. 5 is a perspective view of a receiver for a second example embodiment.
FIG. 7 is a partial view of FIG. 6 showing the connection groove.

Thus, in FIG. 5, it is the external piece 4 of the fixed part 4, 5 which is fixed to the casing of the gearbox, level with the aforementioned opening of the casing.

More precisely this piece 4 forms an external body approximately of annular shape surrounding the internal guide tube 5. The body 4 has two lugs 130, only one of which is visible in FIG. 5, for fixing it to the wall of the gearbox casing, usually by means of screws each passing through an opening 131 on each lug. A third fixing point is also provided, whose the passage hole can be seen at 131.

The rear of the body 4 is roughly in the form of a plate 120 of smaller size than the plate 4 in FIG. 1, from which the front tubular portion 8 of which is formed by casting. The body 4, made of castable material, is for example based on aluminium.

The lugs 130 form part of the plate 120 with three fixing points and extend for the major part radially outwards.

According to one characteristic this is taken advantage of, having regard to the strength of the body 4, in order to extend the latter, to the rear of the wall 8 and of the plate 120, by means of a transverse flange 15 directed radially inwards, constituting the base of the blind cavity 7. This flange 15, referred to as the internal flange, belongs to a rear tubular section 121 extending to the rear of the plate 120. The flange 15, directed radially towards the axis X–X', is thicker than the tube 5.

The flange 15 makes it possible to limit the deformation of the cavity 7 under the effect of the pressure variations to which it is subject during the operations of disengaging and re-engaging the clutch. The movement of the piston 6 is thus more precise and accurate.

In addition the tube 5 is conserved and more precisely the means 16 of connecting it to the body 4, as well as the static sealing joint 17 for the cavity 7. This joint 17 is here toric in shape, whilst being axially oblong in shape for good contact with the tube 5 and a good seal.

Here the connection means 16 consist of fixing by crimping.

More precisely, the rear section 121 is notched, as in FIG. 2, for housing the joint 121 and delimiting the flange 15. A connecting groove 32 is produced at the rear of the flange 15 and the metal of the tube 5 is caused to creep inside the groove 32, here of semicircular section, favourable to good fixing. The thickness of the tube 5 makes this possible. It should be noted that the tube 101 bears here, unlike FIG. 2, directly on the face of the flange 15 turned in the opposite direction to the cavity 7. By virtue of this method of connection, in combination of the flange 15, the tube is simple in shape and does not have, at the rear, a transverse collar for fixing it by crimping it to the body 4. Material is saved on. The tube 5 being of purely tubular shape.

The tube 5 undergoes very slight deformations under the effect of the pressure variations in the cavity 7. The piston 6 moves under good conditions.

These crimping means 16 are offset axially towards the rear with respect to the sealing joint 17 acting between the internal periphery of the flange 15, directed radially inwards, and the external periphery of the guide tube 5. Here the joint 17 is carried by the internal flange 15, whilst being mounted in a splayed sealing groove, not referenced, which the said flange has at its internal periphery. The sealing groove is splayed radially inwards in the direction of the axis X–X' and axially is wider than the connecting groove 32. This flange 15 is of low height and forms part of the rear part of the body 4, whose plate 120 is pierced in order to form the supply inlet 3 opening out in the base of the cavity 7. The pipe 2 is attached by screwing its flange to the top edge of the plate 120, in line with the inlet 3. The crimping means 16—local creep of the tube 5 in the groove 32—are located axially between the joints 17 and 101. It will be noted that the solution is simpler than the one in FIGS. 1 and 2 since the duct 5 is produced in the thickness of the plate 120.

The preloading spring 11 surrounds the tubular portion 8 whilst being centred by it. A shoulder 105 is formed at the junction of the tubular portion 8 with the plate 120 suitable for having the shaft lo pass through it.

It should be noted that the body 4 does not have any drainage duct, this being produced at the external periphery of the pipe 2 at 119.

More precisely, the pipe 2 extends outside of the gearbox casing and passes through the said casing. This pipe has, outside the said casing, a tubular protuberance 119 serving to effect the drainage. This protuberance is normally covered by a protective cap 118. The pipe has an external end 117 shaped as a plug-in female connector with a pin 116 engagled in slots in the end 117 in order to receive the male connector of a conduit coming from the sender.

The pipe 2 has a right-angled shape with a vertical part fixed to the plate 120 and a roughly horizontal part extending outside the gearbox casing and carrying the drain 119 and the end coupling. Here the pipe 2 has a flange with laterally two holes for screws to pass for fixing the flange to the external edge of the plate 120 (FIG. 5). Naturally the pipe 2 can be attached by broaching or screwing to the body 4. The shoulder 105 serves as a support for an end rim which is, as in FIG. 2, on a protective bellows 21 surrounding the spring 11, in the form of a coil spring. The spring 11 bears at one of its ends on the said rim by means of a metallic support piece 123 interposed between the spring and the rim. The piece 123 has two transverse parts connected to each other by a roughly horizontal part. One of the transverse parts is in contact with the end rim radially above the other transverse part in contact with the spring 11 centred by means of a thicker part, on the rear end of the front tubular portion 8.

The other end of the bellows 21 is attached to a metallic bearing and support piece 122, referred to as a carrier piece 122, annular in shape.

The carrier piece 122 is here made of sheet metal and carries the elastic washer 10, usually referred to as a self-centring washer, the bearing 9 and the front end rim on the bellows 21.

The piece 122 is embedded (anchored) partly in the piston 6 made of synthetic material, here made of plastic material reinforced with fibres. The piston 6 can for example be based on "Delrin" or can be made from any other material having good slip qualities. At the front of the piston 6, the scraper joint 150 is provided in order, in a known fashion, to avoid contaminating the friction linings of the friction disc.

The piece 122 has, in order to do this, holes for its firm anchoring in the piston 6 by the moulding-on technique. The piece 122 is therefore fixed by moulding onto the piston 6 made of synthetic material. The piece 122 carries the washer 10, the joint 150, the ball bearing 9, the external race of which cooperates with the end 102 of the fingers of the diaphragm, the end of the bellows 21 and of the preloading spring 11. The piece serves as an abutment for the internal edge of the bearing 9 in the shape of a flag and fluidtight.

In FIG. 6, the dynamic sealing joint can be seen at 80. Naturally the piece 122 can be attached by snapping onto the piston 6. It will be appreciated that the bearing 9 extends for a major part above the piece 122 whilst being directed axially towards the plate 120 in order to reduce the axial dimension.

As a variant, the means 16 of connecting the tube 5 to the body 4 can have another form. Thus, in FIG. 8, the joint 17 is mounted in the bottom of a trapezoidal-shaped connecting and sealing groove 132 section. The local upsetting of material 116 of the tube 5 is effected directly in this groove 132.

The joint 17 is compressed between the upsetting 116, directed in the opposite direction to the axis X–X' and the bottom of the groove 132. In this case the machinings of the flange 15 are reduced.

As a variant, FIGS. 9 and 10, the joint 17 is, as in FIG. 6, placed in a special connecting groove 332 less broad axially than the sealing groove. The connection is effected by means of a circlip 226 corrugated radially and open, mounted in a radial connecting groove 332 of oblong shape formed in the flange 15 and in a groove 333 formed in correspondence with the rear end of the tube 5. This groove 333 leads to the local upsetting of the tube 5 towards the inside in a similar manner in order to form the groove 153. Thus the connection of the tube 5 with the body 5 is effected by snapping on, the circlip being placed in advance in the groove 332. This circlip 226 is elastically deformable radially inwards in order to close up and then relax and fall into the groove 333 when the tube 5 is connected with the body 4.

The internal tube 5 therefore has a symmetrical shape, this tube having a groove (not referenced in FIG. 6) at one end for mounting a circlip. This groove has the same shape as the groove S33. Naturally the joint 80 has an external lip for contact with the internal periphery of the portion 8 of the body 4 and an internal lip for contact with the external periphery of the tube 5.

Naturally the external body can be mounted indirectly on the fixed structure, via the gearbox casing, by means of an adapter sole plate as described for example in the document FR-A-2 745 616.

In this case, the external body is standard and it is the sole plate which carries the fixing lugs for the connecting means of the bayonet type, acting between the sole plate land the external body. The clutch release bearing can have, reversing the structures, a rotating internal race and a non-rotating external race, provided with an internal flange, intended to bear, under the action of the elastic self-centring washer, against the transverse support section on the carrier piece 122.

As is clear from the description of the drawings, the internal flange 15, advantageously obtained by casting, is thicker than the guide tube 5. The connecting means 16 can be drimping or snapping-on means and make it possible to fix the guide tube 5 to the internal flange 15. The connecting grooves 32, 132, 332 for the internal flange open out at the internal periphery of the flange 15.

The external body 4 can be made from mouldable synthetic material, such as plastic material reinforced with fibres.

The circlip in FIG. 6 forms a stop for the piston 6. This stop can have another shape.

It should be noted that the control fluid, here oil, enters the cavity 7 under very good conditions. This is because, in all the figures, the inlet 3, in the form of a duct, opens out at the top part of the front face of the internal flange 15. This top part forms a recess (a notch), rounded in shape and extended by an inclined face.

The internal bore of the portion 8 is also notched at its rear part at the inlet 3. This makes it possible to carry out lapping and prevent the top lip of the joint 80 coming into contact with the flange 15. The recessing of the front face of the flange 18, delimiting the cavity 7, therefore also affects the rear end of the internal periphery of the front portion 8.

Naturally the tube 5 can, as in FIGS. 1 to 4, have an end plate 215, directed radially in the opposite direction to the axis X–X' and crimped at 216 in contact with the rear transverse face 115 of the flange 15 turned in the opposite direction to the cavity 7. The tube does not have any end collar.

The crimping 216 is here of the axial type, the material of the rear section 121 being crushed axially for preferably forming crimping sectors as in the embodiment in FIGS. 1 to 4. It is not the material of the tube which creeps and material is saved on compared with the embodiments in FIG. 2.

Figure 11:
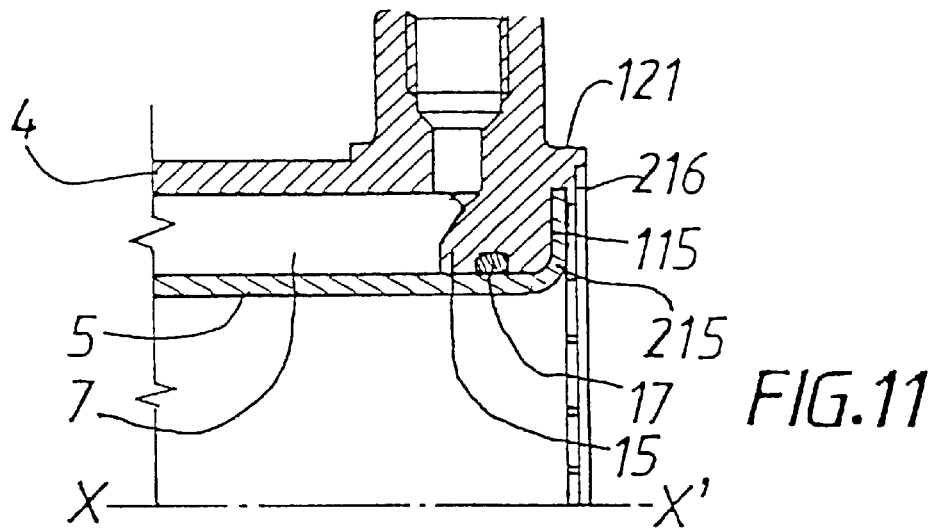
FIGS. 11–13 are views similar to FIG. 8 for other example embodiments.
Figure 12:
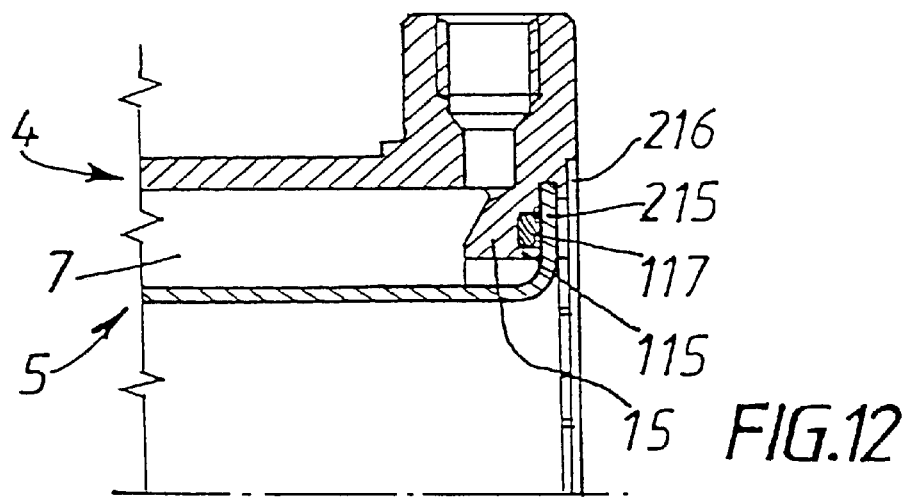

Naturally, FIG. 12, the static joint 117 can be located in a groove (not referenced) formed in the transverse face 115, a radial clearance exists between the tube 5, the flange 215 of which is crimped as in FIG. 11, and the internal periphery of the flange 15.

Figure 13:
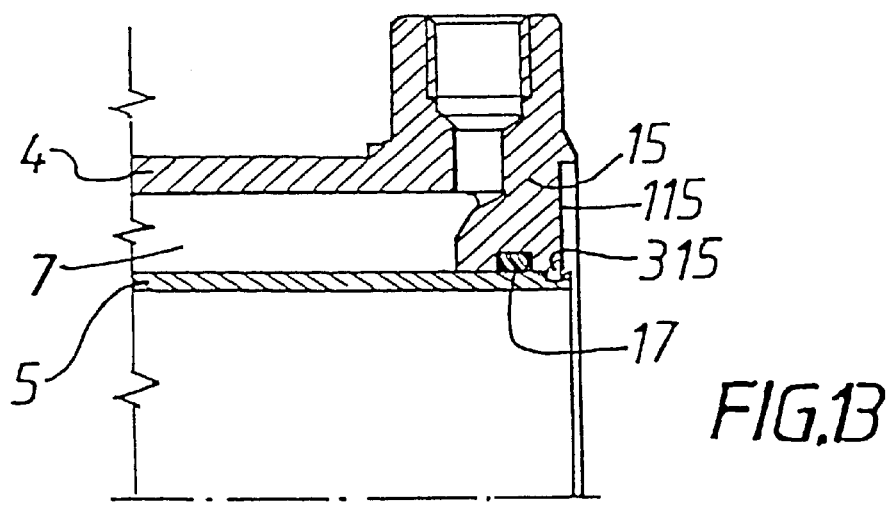

In a variant (FIG. 13) the flange 15 has, at its internal periphery, a collar 315 extending its face 115.

The tube 5 has a reduction in thickness at its end adjacent to the collar 315 in order to form a shoulder formed by means of the reduction in thickness and cooperating with the front face of the collar 315 turned towards the cavity 7. Afterwards, the material of the free end of the guide tube 5 in contact with the rear face of the collar 315 is folded, for fixing the tube 5 to the collar 315 by crimping, the joint 17 being mounted in a sealing groove as in FIGS. 1 and 16.

Naturally, the different embodiments can be combined together, the rotating joint not necessarily being carried by the external body.

Thus the connecting modes in FIGS. 6 to 10 can be effected in the rear face 115 of the internal flange 15.

This face can therefore have a distinct connecting groove and not a sealing groove, the material of the flange 215 being upset inside the connecting groove preferably splayed in the opposite direction to the cavity 7.

In this way a good locking of the tube 5 with respect to rotation is obtained by virtue of the splaying of the connecting groove possibly also forming the sealing groove.

In order to prevent the plate 215 escaping axially in the opposite direction to the cavity, the plate 215 is locked axially by means, for example, of a circlip engaged in a groove in the body in order to grip the plate 215 between the face 115 and the circlip. Advantageously, the connecting groove is located radially above the sealing groove. As a variant, the body 4 is threaded internally at the rear for mounting an externally threaded washer. This washer forms a nut for gripping the plate between the face 115 and the said nut.

As a variant, it is possible to use an intermediate piece crimped as described in the document FR-96 11888, filed on Nov. 30, 1996, in order to effect the axial fixing.

Naturally, the plate 215 can be bonded to the face 115 notably when the body 4 is made from plastic material.

What is claimed is:

1. A hydraulic receiver (1) for clutch control having a fixed part (4, 5) comprising a metallic internal guide tube (5) with an axial axis of symmetry (X–X') and a concentric external body (4) defining a blind annular cavity (7) able to be supplied with fluid and inside which there is mounted, so as to be axially movable, a piston (6) carrying a drive element (9) suitable for acting on a clutch, in which the base of the blind cavity (7) comprises an internal flange (15), on the external body (4), directed towards the axial axis of symmetry (X–X') of the guide tube (5), said internal flange (15) being thicker than the guide tube (5), wherein a static sealing joint acts between the internal flange (15) and the guide tube (5) whilst being mounted in a sealing groove, and wherein connecting means (16, 116) act between the internal flange (15) and the guide tube (5) in order to fix the guide tube to the external body (4), said connecting means (16) including a connecting groove (32, 132, 332) formed in the internal flange (15), wherein said sealing groove (132) is formed in the internal flange (15) and is merged with the connecting groove (132).

2. Receiver according to claim 1, wherein the connecting means (16) consist of crimping means and in that the material of the guide tube (5) is upset locally in the connecting groove (32, 132).

3. Receiver according to claim 1, wherein the sealing joint (17) is interposed between the base of the connecting groove and the local upsetting of material of the guide tube (5).

4. Receiver according to claim 1, wherein the connecting means (16) act between the external periphery of the guide tube (5) and the internal periphery of the internal flange (15).

5. Receiver according to claim 1, wherein a static sealing joint (17) acts between the internal periphery of the internal flange (15) and the external periphery of the guide tube (5).

6. A hydraulic receiver (1) for clutch control having a fixed part (4, 5) comprising a metallic internal Guide tube (5) with an axial axis of symmetry (X–X') and a concentric external body (4) defining a blind annular cavity (7) able to be supplied with fluid and inside which there is mounted, so as to be axially movable, a piston (6) carrying a drive element (9) suitable for acting on a clutch, wherein the base of the blind cavity (7) comprises an internal flange (15), on the external body (4), directed towards the axial axis of symmetry (X–X') of the guide tube (5), said internal flange (15) being thicker than the guide tube (5), wherein a static sealing joint acts between the internal flange (15) and the guide tube (5), and wherein connecting means (16, 116) act between the internal flange (15) and the guide tuble (5) in order to fix the guide tube to the external body (4), wherein the connecting means comprise an elastically deformable member.

7. Receiver according to claim 6, wherein the connecting means include an open annulus of corrugated shape (270) radially engaged in an oblong connecting groove (332) formed in the internal flange and in a facing groove formed in the guide tube (5) at one of its axial ends.

8. Receiver according to claim 1, characterised in that the piston is made from synthetic material and slides directly on the guide tube (5).

* * * * *